United States Patent
Adrian

(10) Patent No.: US 7,361,296 B2
(45) Date of Patent: Apr. 22, 2008

(54) MOTOR VEHICLE WHEEL FRAME

(75) Inventor: Christian Andreas Adrian, Pretoria (ZA)

(73) Assignee: High-Flyer Investment 5 (Proprietary) Limited, Northriding (ZA)

(*) Notice: Subject to any disclaimer, the term of this patent is extended or adjusted under 35 U.S.C. 154(b) by 282 days.

(21) Appl. No.: 10/502,640

(22) PCT Filed: Jan. 24, 2003

(86) PCT No.: PCT/IB03/00182

§ 371 (c)(1),
(2), (4) Date: Feb. 3, 2005

(87) PCT Pub. No.: WO03/061933

PCT Pub. Date: Jul. 31, 2003

(65) Prior Publication Data

US 2005/0121970 A1 Jun. 9, 2005

(30) Foreign Application Priority Data

Jan. 25, 2002 (ZA) ................................ 2002/0700

(51) Int. Cl.
*B28B 7/42* (2006.01)
*B28B 7/16* (2006.01)
*B28B 7/30* (2006.01)

(52) U.S. Cl. ........................ 264/257; 264/313; 249/56; 249/142; 249/176; 249/178; 301/64.702; 301/64.705; 301/64.706

(58) Field of Classification Search ........... 301/64.701, 301/64.702, 64.703, 64.704, 64.705; 249/56, 249/142, 176, 178; 425/DIG. 44, DIG. 58; 264/230, 257, 313
See application file for complete search history.

(56) References Cited

U.S. PATENT DOCUMENTS

| | | | | |
|---|---|---|---|---|
| 4,514,013 A | * | 4/1985 | Woelfel et al. | 301/64.703 |
| 4,527,839 A | * | 7/1985 | Fujitaka et al. | 301/64.705 |
| 4,762,740 A | * | 8/1988 | Johnson et al. | 428/68 |
| 4,930,843 A | * | 6/1990 | Lewis | 301/64.705 |
| 4,995,675 A | * | 2/1991 | Tsai | 301/64.705 |
| 5,246,275 A | * | 9/1993 | Arredondo, Jr. | 301/64.705 |
| 5,415,463 A | * | 5/1995 | Olson et al. | 301/64.702 |
| 5,564,793 A | * | 10/1996 | Whiteford | 301/64.703 |
| 5,820,804 A | * | 10/1998 | Elmaleh | 264/167 |
| 6,086,161 A | * | 7/2000 | Luttgeharm et al. | 301/95.102 |
| 6,347,839 B1 | * | 2/2002 | Lew et al. | 301/95.102 |
| 6,458,306 B1 | * | 10/2002 | Nelson et al. | 264/221 |
| 6,644,954 B2 | * | 11/2003 | Sloman | 425/389 |
| 6,758,533 B1 | * | 7/2004 | Hummel et al. | 301/64.101 |
| 2007/0194619 A1 | * | 8/2007 | Colegrove et al. | 301/95.101 |

FOREIGN PATENT DOCUMENTS

| | | |
|---|---|---|
| DE | 4230469 C1 | 4/1994 |
| EP | 1 249 355 | 10/2002 |
| JP | 62-105614 * | 5/1987 |
| WO | WO 94/06610 A1 | 3/1994 |

* cited by examiner

*Primary Examiner*—Russell D. Stormer
(74) *Attorney, Agent, or Firm*—Ladas and Parry LLP

(57) ABSTRACT

A motor vehicle wheel frame is integrally molded in a split mold including a lower mold portion (12) and a complemental mold portion. Channel-like spoke forming formations (12.1) receive layers (24.1) of molding material wrapped around heat expanding, resilient intensifiers (20) which are inwardly checked by resilient locking inserts (22) partially within a hub cavity and abutting a cylinder (18). During demolding, after curing, the locking inserts (22) and thereafter the intensifiers (20) are removed by longitudinally stretching and cross-sectionally reducing them, leaving the spokes hollow. During curing, the heat expanding intensifiers pressurize the spoke forming layers of molding material against the mold portions.

26 Claims, 3 Drawing Sheets

MOTOR VEHICLE WHEEL FRAME

THIS INVENTION relates to a motor vehicle wheel frame. It relates also to a method of forming a molded motor vehicle wheel frame, and to a molding assembly for molding a motor vehicle wheel frame.

For purposes of this specification, the term "wheel frame" shall be used to denote the portion of a road wheel without a tire, and without a hub bearing arrangement.

The invention is expected to be particularly advantageously applicable to motorcycle wheels, especially two-wheeled motorcycle wheels with which corners are negotiated by "leaning into the corner", i.e. without imparting substantial lateral forces via the wheels.

The kind of wheelframe to which this invention relates is conventionally formed generally of first and second side members in the form of shells of molded synthetic polymeric material, each side member including a rim formation at an outer periphery thereof, a hub formation at an inner periphery thereof, and a plurality of circumferentially spaced spoke portions extending outwardly from the hub formation to the rim formation, the spoke portions, in cross-section, being complementary convex to be closable onto each other in pairs to form hollow spokes. The side members are secured side by side i.e. coaxially and the rim and the hub are formed, thus providing a wheel with hollow spokes.

In accordance with a first aspect of this invention, there is provided a method of molding a wheel frame of synthetic polymeric material, the method including the steps of forming spoke members, ultimately to provided spokes for the wheel frame, by wrapping each of a plurality of elongate intensifiers of predetermined shape and size and of a resilient, thermo-expanding material in layers of reinforced, resin pre-impregnated molding material, leaving at least one end open;

arranging the spoke members in a mold and integrating the spoke members with molding material such as to form a rim toward a radially outer circumference of the mold, and such as to form a hub member toward a radial center of the mold;

curing the molding while in the mold under high temperature and high pressure, and causing the intensifiers to expand to compress the wrapped material around the intensifiers between an outer surface of each intensifier and a complemental mold surface;

removing and reclaiming the intensifiers intact via the at least one open end after curing.

The open end may preferably be at a radially inner end of each spoke.

Arranging the spoke members in the mold and integrating the spoke members with molding material toward the center of the mold may include forming a central aperture into which the open ends open, removing the intensifiers then being via said central aperture.

Each intensifier is in the form of an intensifier assembly which includes an elongate limb and at least one locking insert adjacent an end of the limb, removing each intensifier then including initially removing the locking insert and then removing the limb. Removing the intensifier may advantageously, conveniently, include stretching each component forming the intensifier longitudinally to cause it to shrink or contract laterally to facilitate removal.

Advantageously, further to facilitate removal, each limb may be a composite limb, comprising a plurality of superimposed layers or laminates, the method including stretchingly removing the individual layers or laminates in sequence.

In accordance with the above method, the wheel frame is produced as a one-piece or unitary or integral molding. It is to be appreciated that the spokes are the only components which are hollow. It is thus a feature of this invention that during curing in the mold under high temperature and high pressure, the spoke walls are supported against the thermo-expanding intensifiers causing the walls to be subjected to pressure without risking collapsing the spoke walls.

In accordance with a second aspect of the invention, there is provided a method of forming a motor vehicle wheel frame, of the general kind to which this invention relates, including forming the wheel frame as a one-piece or unitary molding by way of laying up resin impregnated fiber reinforced layers in a first side portion or side portions of a mold to form a first side of the wheel;

laying up resin impregnated fiber reinforced layers in a second side portion or side portions of the mold to form a second side of the wheel, the first and the second sides being mating sides;

wrapping spoke core or intensifier bodies in resin impregnated fiber reinforced layers;

locating the wrapped spoke core or intensifier bodies in operative positions on either one of the first or the second side members respectively in spoke defining recesses provided for this purpose in the respective side portion or side portions of the mold;

mating the first and the second side members with the located spoke core or intensifier bodies therebetween by operatively securing the two side portions of the mold together;

wrapping resin impregnated fiber reinforced layers circumferentially around the mated side members on a rim defining recess defined by the operatively intersecured side portion or side portions of the mold to form a rim;

curing the assembly thus formed under high pressure and high temperature; and removing the spoke core or intensifier bodies and splitting the molds only after curing of the assembly.

Typically, curing may take place at a temperature of about 120° C. and a pressure of about 600 kPa.

Wrapping the spoke core or intensifier bodies in the resin impregnated fiber reinforced layers may include causing the layers of the material to extend outwardly beyond operatively outer ends of the bodies, the method then including making circumferentially spaced cuts in the outwardly extending portions of the material and splaying open the portions to interleave the material laid up in the rim defining recess and the material wrapped around the side members, thereby to enhance bonding of the rim to the spokes.

Locating the spoke core or intensifier bodies in the spoke defining recesses may include checking operatively inner ends of the bodies against inward and tangential movement. The method may include restricting radially outward movement of the spoke core or intensifier bodies, by means of their particular shapes, for example by having the spoke forming portions and the spoke defining recesses tapering radially outwardly.

The method may include forming a hub cavity by means of located, operatively inner ends of the spoke core or intensifier bodies. The method may include removing the spoke core or intensifier bodies by withdrawing them inwardly into the hub cavity.

In accordance with a third aspect of this invention, there is provided a motor vehicle wheel frame in the form of a molding of fiber reinforced synthetic polymeric material, which wheel frame includes an outer, circular rim of channel section for seating a tire in use;

a plurality of hollow spokes extending inwardly from the rim; and a concentric, central hub cavity at inner ends of the spokes, and providing hub mounting formations for mounting components which will form a hub in use, in which the molding is a one-piece or unitary molding.

The spokes may be curved. The spokes may be tapered toward the rim.

The hub mounting formations may be in the form of central, co-axial apertures in opposing faces of the hub cavity.

In accordance with a fourth aspect of this invention, there is provided a molding assembly for molding a motor vehicle wheel frame as a one-piece or unitary or integral molding, the molding assembly including a circular wheel mold split into side portions closeable onto each other, one side portion of which, in use, will be a mold lower part and the other side portion a mold upper part, each side portion including an outer, circular rim formation defining a rim recess;

a plurality of spoke portions extending inwardly from the rim formation and defining respectively spoke portion recesses;

a concentric, central hub mounting formation at inner ends of the spoke portions and defining a hub recess;

securing formations for securing one side of the mold to the other side of the mold in use; and a plurality of spoke core or intensifier bodies generally complemental to and locatable with annular clearance within the spoke portion recesses.

The molding assembly may include a locating or locking arrangement for locating the spoke core or intensifier bodies, when in the spoke portion recesses, against inward and tangential movement. The locating arrangement may include a locating shoulder provided by a periphery of a central protuberance fast with one of the mold parts, conveniently the mold lower part, the shoulder being arranged for abutment by operatively inner ends of the intensifier bodies in use, thereby locating them against inward movement. The locating arrangement may thus include a round cylindrical, or polygonal, sleeve complemental to and placeable on the protuberance. The mold upper part may then provide a central, round cylindrical recess for receiving the sleeve when the mold sides are closed on to each other.

The locating arrangement may include separate locking or locating inserts snugly, removably insertable inbetween the inner ends of adjacent spoke core or intensifier bodies to restrict said bodies against inward and tangential movement.

The spoke portions of the two sides of the mold may extend curvingly toward the hub mounting formations. The spoke portions may taper toward the rim formations.

The spoke core or intensifier bodies may be of a thermo expansive material and may advantageously be re-usable. They may be in the form of moldings.

Inner end portions of the spoke core or intensifier bodies may be extended, having tongue-like inner ends, the extended portions defining, partially, a hub cavity and locating the bodies against outward movement toward the rim in use, the tongue-like inner ends preventing withdrawl of the bodies inwardly into the hub cavity unless the inner ends are deformed.

The spoke core or intensifier bodies may be of composite structure, being lengthwise split to form laminates to facilitate damage-free withdrawal thereof from a molded wheel frame in use.

The locking or locating inserts may define, partially, a hub cavity, and may be withdrawable inwardly into the hub cavity.

The locking or locating inserts may be of a material similar to that or identical to that of the spoke core or intensifier bodies, and may be in the form of moldings. They may be re-usable.

Further in accordance with the invention, broadly, there is provided a method of molding a fiber reinforced, synthetic polymeric wheel frame comprising an outer rim, an inner hub and hollow spokes extending generally radially from the hub to the rim, the method including the steps of locating intensifiers of resilient, heat expanding material in the hollow spokes by means of locking inserts intermediate radially inner end portions of the inserts which inserts project from radially inner ends of the spokes, expanding the intensifiers to compress molding material forming walls of the spokes against mold surfaces during curing, removing the locking inserts after curing and resiliently, stretchingly withdrawing the intensifiers from the spokes.

The invention is now described by way of example with reference to the accompanying diagrammatic drawings. In the drawings, FIG. 1 shows, in three dimensional view, a lower mold portion of a mold assembly in accordance with the invention during the process of laying up molding material in the mold portion;

Figure 1:
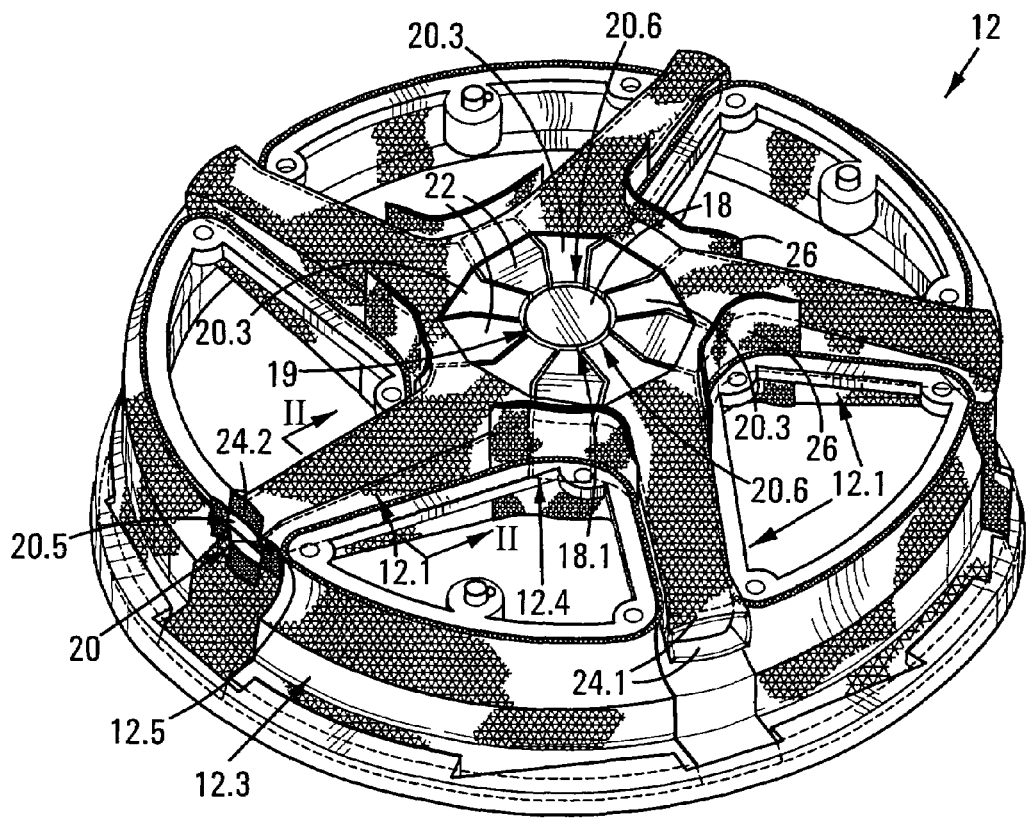
Figure 2:
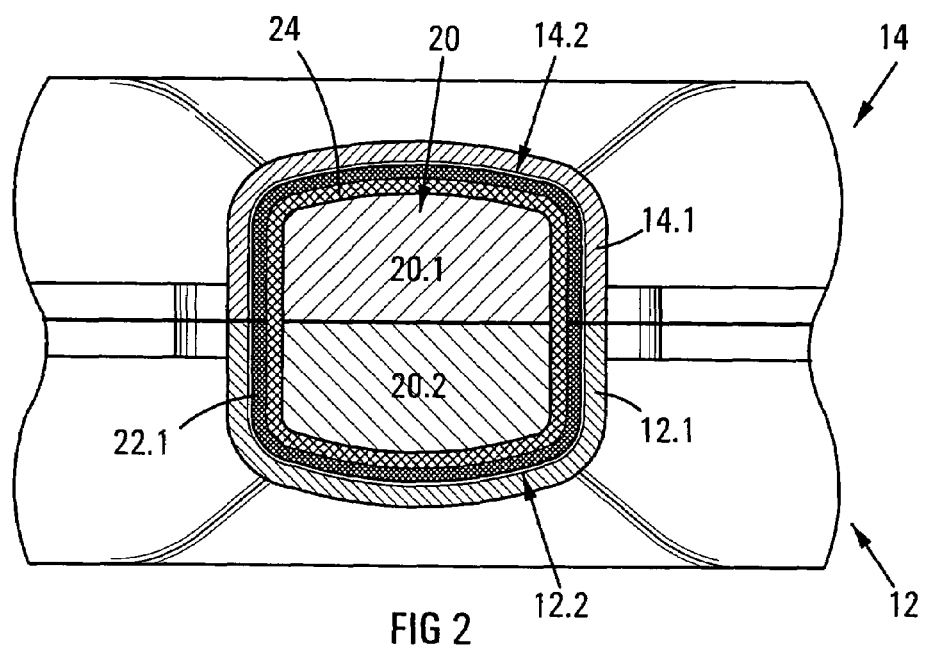
FIG. 2 shows, to a larger scale, a view corresponding to section II-II in FIG. 1.
Figure 3:
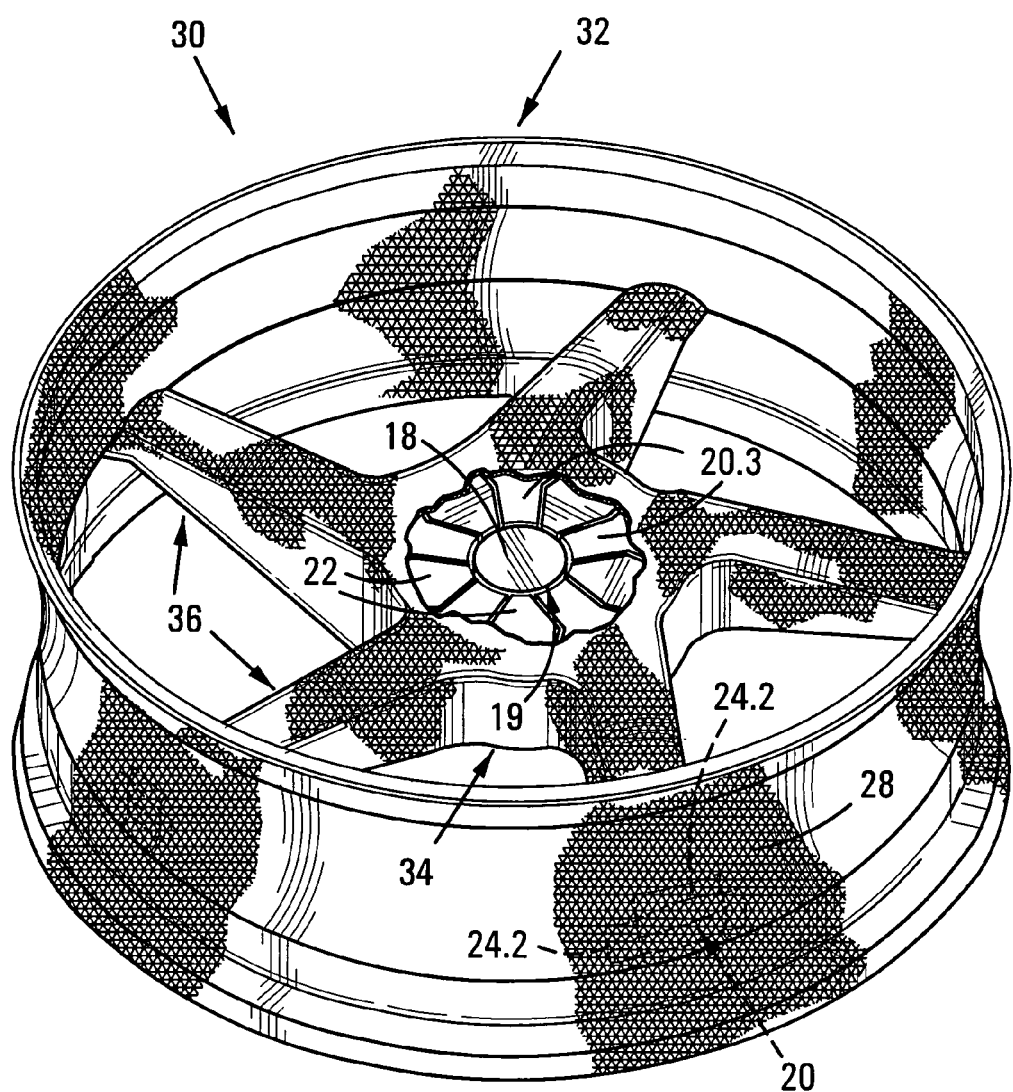
FIG. 3 shows, in a view corresponding to that of FIG. 1, a wheel frame in accordance of the invention during the final stages demolding.
Figure 4:
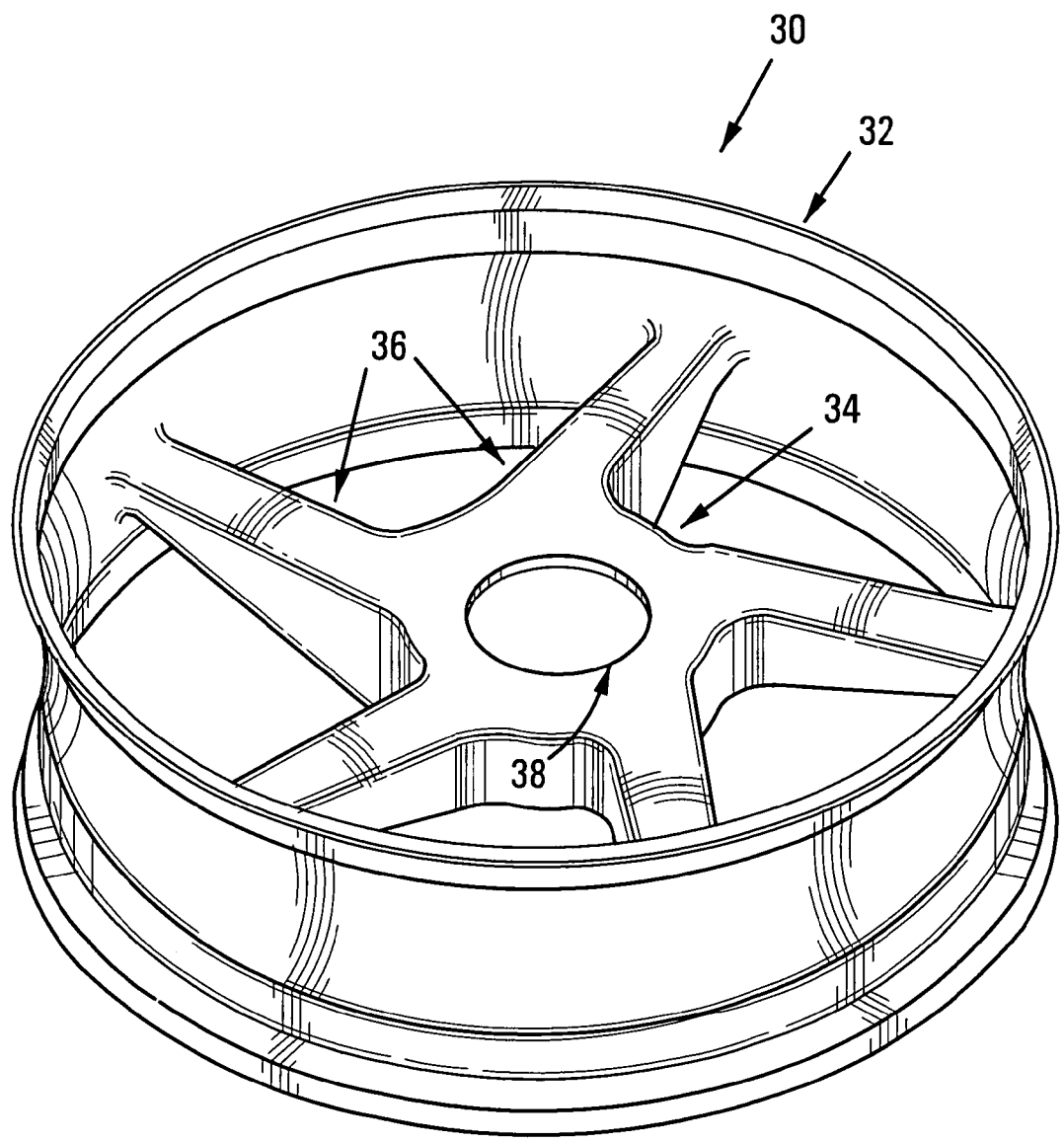
FIG. 4 shows, in a view corresponding to FIG. 3, the wheel frame molded in accordance with the invention in finished form.

With reference to the drawings, more specifically FIGS. 1 and 2, a wheel frame 30 shown in semi-finished form in FIG. 3 and in finished form in FIG. 4 is molded in a split mold comprising a lower mold portion 12 shown in FIG. 1 and a complemental upper mold portion which is not shown in the drawings (other than fragmentarily in FIG. 2) but which can easily be visualised by a person skilled in the art. Generally, each component or feature of the lower mold portion has a complemental counterpart in the upper mold portion.

The lower mold portion comprises a plurality of spoke forming formations, in this embodiment five spoke forming formations, generally indicated by reference numerals 12.1. The spoke forming formations form hollow, channel-like recesses 12.2 for molding spokes 36 (FIGS. 3 and 4). The spoke forming formations of the lower and upper mold portions are closeable onto each other, as can be visualised from FIG. 2, to form an enclosed cavity for forming the spokes 36.

The lower mold portion 12 comprises a circumferential rim forming formation 12.3 which, together with the corresponding formation of the upper mold portion, form a well for forming a rim 32 (FIGS. 3 and 4).

Likewise, the lower mold portion 12 includes a hub forming formation 12.4 which, in conjunction with a corresponding formation of the upper mold portion, form a hub 34 (FIGS. 3 and 4) during molding. The spoke forming formations extend generally radially to interconnect the hub forming formations and the rim forming formations.

During a first step, layers of reinforced, resin impregnated molding material are laid up in the respective mold portions against the molding surfaces.

In accordance with the invention, in respect of each spoke, there is provided an intensifier comprising a composite intensifier limb generally indicated by reference numeral 20 and comprising a pair of laminates 20.1 and 20.2 molded from a silicone based, heat expanding, resilient material. Each pair of intensifier laminates form a composite intensifier limb which will be used as a core for forming a hollow spoke.

Each composite intensifier limb 20 is wrapped in layers of reinforced, resin impregnated molding material 24, as can best be seen from FIG. 2 to form spoke members. The wrapped intensifier limbs or spoke members are then placed within respective spoke forming formations 12.1, being seated in the respective recesses 12.2 of the lower mold portion 12.

It is to be appreciated that radially outer ends 20.5 of the intensifier limbs 20 are flush with an open end 12.5 of the spoke forming formation 12.1, as shown in FIG. 1. End portions 24.2 of the wrapping 24 extend beyond the open end 12.5 of the spoke forming formation 12.1. The end portions 24.2 of the wrapping 24 project into the rim forming formation cavity.

Inner end portions 20.3 of the intensifier limbs 20 extend inwardly beyond inner mouths of the spoke forming formations 12.1. In accordance with the invention, a central cylinder 18 in the form of a sleeve is positioned in the mold portion 12 via a central protuberance to be at the center of the mold portion 12 and to extend axially. Inner ends 20.4 of the end portions 20.3 of intensifier limbs 20 are checked against the cylinder 18 such that the intensifier limbs 20 are exactly, radially, located. It is to be appreciated that the wrapping 24 does not extend to the inner end 20.4 of each intensifier limb 20.

Further, in accordance with the invention, locking inserts 22 are positioned intermediate adjacent inner projecting end portions 20.3 of the respective intensifier limbs 20 to fill up cavities intermediate such inner end portions 20.3 of the intensifier limbs 20. Also the locking inserts 22 are inwardly checked against the cylinder 18. The locking inserts 22 and the cylinder 18 form a locking arrangement for the intensifier limbs 20. Outwardly, the locking inserts 22 are positioned against the hub forming formations 12.4. In this fashion, the intensifier limbs 20 are precisely located with a snug fit leaving no clearance, neither in tangential nor in radial direction. The intensifier limbs 20 and locking inserts 22 form intensifier assemblies in accordance with the invention.

Bridging layers 26 of reinforced, resin impregnated material are provided in the areas of the hub forming formations 12.4 overlapping inner end portions 20.3 and sides of the wrapped intensifier limbs 20 and positioned intermediate radially outer ends of the locking inserts 22 and the hub forming formations 12.4. When the wrapped intensifier limbs 20 have been put in position, the bridging layers 26 are folded inwardly over the wrapped intensifier limbs and the upper mold portion 14 can then be closed over and secured to the lower mold portion 12.

The projecting outer ends 24.1 of the wrapping 24 around the intensifier limbs are cut and turned back to form flaps 24.2 which are splayed open over the pre-laid up layers of reinforced resin impregnated molding material in the rim forming formations 12.3. Further, superimposing layers of molding material are then laid up in the well formed by the rim forming formations 12.3 to form a rim.

When the molding assembly has been fully laid up, it is cured under high pressure and high temperature. All of the surfaces of the molding material, with the exception of the spokes, are exposed to external pressure and such molding material is then pressurised against the supporting mold surfaces to ensure that that molding material is cured under high pressure and high temperature conditions.

As can best be perceived from FIG. 2, the walls of the spokes being formed are externally covered by the spoke forming formations 12.1 and 14.1 of respectively the lower mold portion 12 and the upper mold portion 14. Their internal surfaces are supported by the outer surfaces of the respective intensifier limbs 20. Because the intensifier limbs 20 are of heat expanding material, during curing under high temperature conditions, the intensifier limbs 20 expand and compress the molding material forming these spokes against the spoke forming formations of the mold portions thus ensuring that also that molding material is cured under conditions of high temperature and high pressure.

After curing, the mold portions are split, the cylinder 18 is removed to expose apertures 38 corresponding to abutment of the molding material against the periphery of the central cylinder 18. Only one aperture 38 is shown in FIG. 4, but bearing in mind the stipulation above that each component or feature of the upper and lower mold portions 14, 12 are provided in complemental counterparts, it can easily be appreciated that the aperture 38 has a counterpart, and that they are co-axial. The radially inner ends of the intensifier laminates 20.1, 20.2 and also the radially inner ends of the locking inserts 22 are exposed. Removal of the cylinder 18 provides a central round cavity 19, shown at the outer surface of the cylinder 18 in FIGS. 1 and 3, thus enabling the locking inserts 22 to be removed, bearing in mind that the material is resilient and can be stretched. When the locking inserts 22 have been removed, the respective laminates 20.1, 20.2 of the respective intensifier limbs 20 can be retracted from the spoke cavities, bearing in mind that the material of the intensifier laminates is resilient and longitudinal stretching thereof shrinks them in cross-section thus facilitating removal.

The wheel frame molding is thus de-molded and can be finished off.

It is of extreme importance that the wheel frame 30 is formed as a unitary molding. Bearing in mind that it is regarded by the applicant as essential that curing, also of the spoke walls, must take place at high temperature and high pressure, it is a very important advantage that this invention allows intensifier limbs to be placed within the spokes 36 and to be reclaimed intact after molding to be available for re-use.

The invention claimed is:

1. A method of molding a wheel frame of synthetic polymeric material, the method including the steps of
  forming spoke members, ultimately to provide spokes for the wheel frame, by wrapping each of a plurality of elongate intensifiers of predetermined shape and size and of a resilient, thermo-expanding material in layers of reinforced, resin pre-impregnated molding material, leaving at least one end open;
  arranging the spoke members in a mold and integrating the spoke members with molding material such as to form a rim toward a radially outer circumference of the mold, and such as to form a hub member toward a radial center of the mold;
  curing the molding while in the mold under high temperature and high pressure, and causing the intensifiers to expand to compress the wrapped material around the intensifiers between an outer surface of each intensifier and a complemental mold surface;

removing and reclaiming the intensifiers intact by way of the at least one open end after curing.

2. A method as claimed in claim 1, and in which the open end is at a radially inner end of each spoke.

3. A method as claimed in claim 1, in which arranging the spoke members in the mold and integrating the spoke members with molding material toward the center of the mold include forming a central aperture into which the open ends open, removing the intensifiers then being by way of the central aperture.

4. A method as claimed in claim 1, in which each intensifier is in the form of an intensifier assembly which includes an elongate intensifier limb and at least one locking insert adjacent an end of the elongate intensifier limb, removing each intensifier then including initially removing the locking insert and then removing the elongate intensifier limb.

5. A method as claimed in claim 4, in which removing the intensifier includes stretching each component forming the intensifier longitudinally to cause it to shrink or contract laterally to facilitate removal.

6. A method as claimed in claim 5, in which each elongate intensifier limb is a composite limb, comprising a plurality of superimposed layers or laminates, the method including stretchingly removing the layers or laminates individually in sequence.

7. A method as claimed in claim 1, in which the wheel frame is produced as a one-piece or unitary molding.

8. A method of forming a molded motor vehicle wheel frame of synthetic polymeric material, including forming the wheel frame as a one-piece or unitary molding by way of laying up resin impregnated fiber reinforced layers in a first mold portion or mold portions of a mold to form a first side of the wheel;

laying up resin impregnated fiber reinforced layers in a second mold portion or mold portions of the mold to form a second side of the wheel, the first and the second sides being mating sides;

wrapping intensifier bodies which will be used as cores for forming hollow spokes in resin impregnated fiber reinforced layers;

locating the wrapped intensifier bodies in operative positions on either one of the first or the second mold portions respectively in spoke forming formations provided for this purpose in the respective mold portion or mold portions of the mold;

mating the first and the second side members with the located intensifier bodies therebetween by closing the two mold portions of the mold together;

wrapping resin impregnated fiber reinforced layers circumferentially around the mated side members on a rim defining recess defined by the closed together mold portion or mold portions of the mold to form a rim;

curing the assembly thus formed under high pressure and high temperature; and removing the intensifier bodies and splitting the molds only after curing of the assembly.

9. A method as claimed in claim 8, in which wrapping the spoke core or intensifier bodies in the resin impregnated fiber reinforced layers includes causing the layers of the material to extend outwardly beyond operatively outer ends of the intensifier bodies, the method then including cutting and turning back and splaying open the layers of material extending outwardly beyond the operatively outer ends of the intensifier bodies to form flaps over pre-laid up layers of the resin impregnated fiber reinforced layers and superimposing further layers of the molding material, thereby to enhance bonding of the rim to the spokes.

10. A method as claimed in claim 8, in which locating the spoke core or intensifier bodies in the spoke defining recesses includes checking inner ends of the intensifier bodies against inward and tangential movement.

11. A method as claimed in claim 10, which includes forming a hub cavity by means of the inner ends of the spoke core or intensifier bodies.

12. A method as claimed in claim 11, which includes removing the spoke core or intensifier bodies by withdrawing them inwardly into the hub cavity.

13. A molding assembly for molding a motor vehicle wheel frame as a one-piece or unitary molding, the molding assembly including a circular wheel mold split into side portions closeable onto each other, one side portion of which, in use, will be a mold lower portion and the other side portion a mold upper portion, each side portion including an outer, circular rim formation defining a rim recess;

a plurality of spoke portions extending inwardly from the rim formation and defining respectively spoke portion recesses;

a concentric, central hub mounting formation at inner ends of the spoke portions and defining a hub recess;

securing formations for securing one side of the mold to the other side of the mold in use; and a plurality of spoke core or intensifier bodies generally complemental to and locatable with annular clearance within the spoke portion recesses.

14. A molding assembly as claimed in claim 13, which includes a locking arrangement including a central cylinder for locating the intensifier bodies, when in the spoke portion recesses, against inward and tangential movement.

15. A molding assembly as claimed in claim 14, in which the locking arrangement includes a checking formation provided by a periphery of a central cylinder or sleeve positioned within the mold lower portion, the cylinder or sleeve being arranged for abutment by operatively inner ends of the intensifier bodies in use, thereby locating them against inward movement.

16. A molding assembly as claimed in claim 15, in which the mold upper portion provides a central protuberance for receiving the sleeve when the mold portions are closed on to each other.

17. A molding assembly as claimed in claim 14, in which the locating arrangement includes separate locking inserts snugly, removably insertable inbetween the inner ends of the respective spoke core or intensifier bodies to restrict the intensifier bodies against inward and tangential movement.

18. A molding assembly as claimed in claim 17, in which the locking inserts define, in conjunction with the inner ends of the spoke core or intensifier bodies, a hub cavity, and are withdrawable inwardly into the hub cavity.

19. A molding assembly as claimed in claim 18, in which the locking inserts are re-usable.

20. A molding assembly as claimed in claim 19, in which the locking inserts are in the form of moldings molded from a silicone based, heat expanding, resilient material.

21. A molding assembly as claimed in claim 14, in which the intensifier bodies are in the form of moldings of a silicone based, heat expanding, resilient material and are re-usable.

22. A molding assembly as claimed in claim 21, in which inner end portions of the intensifier bodies are extended and define, partially, a hub cavity and locating the bodies against outward movement toward the rim in use, the inner ends being checked against the locking arrangement to prevent withdrawl of the bodies inwardly into the hub cavity.

23. A molding assembly as claimed in claim 22, in which the spoke core or intensifier bodies are lengthwise split to form laminates to facilitate damage-free withdrawal thereof from a molded wheel frame in use.

24. A molding assembly as claimed in claim 13, in which the spoke portions of the two mold portions extend curvingly toward the hub forming formations.

25. A molding assembly as claimed in claim 13, in which the spoke portions taper toward the rim formations.

26. A method of molding a fiber reinforced, synthetic polymeric wheel frame comprising an outer rim, an inner hub and hollow spokes extending generally radially from the hub to the rim, the method including the steps of locating intensifiers of resilient, heat expanding material in the hollow spokes by means of locking inserts intermediate radially inner end portions of the intensifiers, which intensifiers project from radially inner ends of the spokes, expanding the intensifiers to compress molding material forming walls of the spokes against mold surfaces during curing, removing the locking inserts after curing and resiliently, stretchingly withdrawing the intensifiers from the spokes.

* * * * *